UNITED STATES PATENT OFFICE.

ERNEST D. REED, OF DUBLIN, INDIANA, ASSIGNOR TO THE HENRY C. BLAIR COMPANY, OF WILMINGTON, DELAWARE, A CORPORATION OF DELAWARE.

ANTISEPTIC COMPOSITION.

984,106.     Specification of Letters Patent.     Patented Feb. 14, 1911.

No Drawing.     Application filed May 27, 1909. Serial No. 498,744.

*To all whom it may concern:*

Be it known that I, ERNEST D. REED, a citizen of the United States, residing at Dublin, in the county of Wayne and State of Indiana, have invented certain Improvements in Antiseptic Compositions, of which the following is a specification.

My invention is an antiseptic composition designed for use as a surgical dressing. It is produced by combining phthalic anhydrid with iodin and potassium iodid and disseminating the product in the form of a dry powder through a mass of dry pulverized material, either inert or active, that will serve as a mechanical diluent, retard the dissociation of the unstable phthalic anhydrid compound which results from exposure to the air or watery moisture, modify the action of such compound upon wounds and sores, and provide the bulk necessary in a dressing.

The action of phthalic anhydrid upon iodin and potassium iodid produces a compound, having the chemical formula $(C_8H_4O_3)_2KII_4$, which cannot be used alone as a surgical dressing because it is unstable, it readily dissociates in the air or by contact with watery moisture, the rapid liberation of the high iodin contents of the undiluted compound causes excessive irritation, and the amount of the undiluted compound that could be used would not have sufficient volume for protecting exposed surfaces or wounds, ulcers and the like.

I have found that highly useful compositions are produced by mechanically mixing the dry pulverized chemical (compounded from phthalic anhydrid, iodin and potassium iodid) with various proportions of various dry, pulverized ingredients having absorbent, drying, astringent, antiseptic or demulcent properties, or properties which stimulate the wound, ulcer or the like to granulation. Among such ingredients are purified or unpurified talcum, acetanilid, bismuth subnitrate, bismuth carbonate, hydroxid, subgallate, albuminate, oxychlorid, beta-naphtholate, phenolate, tribromphenolate, tannate, resorcinate, salicylate, subtannate, subsalicylate, oxyiodid subgallate (airol), iodo bismuth anhydro methylene albuminate (bismuth formic iodid), bismuth oxyiodid, phthalate, zinc oxid, stearate, sulfocarbonate, sulfate, magnesium carbonate, magnesium oxid, calcium carbonate, boric acid, salicylic acid, thymol iodid, alum, terra alba (aluminum silicate), kaolin and inert earths.

The proportions of the ingredients mixed with the anhydrid compound will vary with the ingredients used, for the purposes desired, and will be determined by the strength required, which may vary through comparatively wide limits and will depend primarily on the degree of activity required. A composition of about one part of the anhydrid compound and nine parts of the diluent is generally very satisfactory, as in such composition the iodin is released from the compound at the moderate rate that is desired for the purposes of the dressing, the activity of the dressing is prolonged in a desired manner by the reduction in the rate of dissociation of the compound, and the desired bulk is obtained for protecting the sore.

It will be understood that the composition may contain the phthalic anhydrid compound and several substances having several properties specified, the invention not being limited to a combination of two substances.

The composition may contain a diluent or diluents having at the same time drying, antiseptic and astringent properties as in case of a composition comprising phthalic anhydrid, iodin, potassium iodid and say bismuth salicylate, bismuth beta-naphtholate or bismuth sulfocarbolate, or all of these. Or the composition may comprise a compound containing phthalic anhydrid, iodin, potassium iodid and a neutral substance having diluent properties, as talcum or magnesium carbonate, with further diluents having antiseptic and astringent properties, as bismuth salicylate, bismuth beta-naphtholate or bismuth subsalicylate. Where the diluent is possessed of active properties it is generally desirable to increase the proportion thereof over the proportion that would be used where the diluent is neutral, and in the case of the use of bismuth salicylate, bismuth, beta-naphtholate or bismuth sulfocarbolate, without other diluent, satisfactory proportions for the composition would generally be about one part of the anhydrid compound and from fifteen to twenty parts of the active diluent.

Having described my invention, I claim:

1. An antiseptic composition comprising a compound of phthalic anhydrid, iodin and potassium iodid, and a non-liquid diluent adapted for retarding the liberation of iodin mechanically mixed therewith.

2. An antiseptic composition comprising a dry, pulverized compound of phthalic anhydrid, iodin and potassium iodid, and a dry, pulverized diluent mechanically mixed therewith.

3. An antiseptic composition comprising a compound of phthalic anhydrid, iodin, and potassium iodid, and a non-liquid drying substance mixed therewith.

4. An antiseptic composition comprising a compound of phthalic anhydrid, iodin and potassium iodid, and mixed therewith a non-liquid diluent having drying and antiseptic properties.

5. An antiseptic composition comprising a compound of phthalic anhydrid, iodin and potassium iodid and mixed therewith a non-liquid diluent having drying, antiseptic and astringent properties.

In witness whereof I have hereunto set my name this 20th day of May, 1909, in the presence of the subscribing witnesses.

ERNEST D. REED.

Witnesses:
WILLIAM E. FLOYD,
ALBERT BURR.